(12) United States Patent
Wu

(10) Patent No.: US 8,279,817 B2
(45) Date of Patent: Oct. 2, 2012

(54) METHOD OF MANAGING DISCONTINUOUS RECEPTION OFFSET IN A WIRELESS COMMUNICATIONS SYSTEM AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 477 days.

(21) Appl. No.: 12/545,061

(22) Filed: Aug. 20, 2009

(65) Prior Publication Data

US 2010/0111010 A1 May 6, 2010

Related U.S. Application Data

(60) Provisional application No. 61/110,961, filed on Nov. 3, 2008.

(51) Int. Cl.
*H04W 4/00* (2009.01)
*H04W 24/00* (2009.01)
*H04W 72/00* (2009.01)
*G01R 31/08* (2006.01)

(52) U.S. Cl. ........ 370/329; 370/328; 370/241; 455/423; 455/450

(58) Field of Classification Search ........................ None
See application file for complete search history.

(56) References Cited

U.S. PATENT DOCUMENTS

2011/0267959 A1* 11/2011 Yi et al. .................. 370/241

FOREIGN PATENT DOCUMENTS

| WO | 2007148175 A1 | 12/2007 |
| WO | 2007148198 A2 | 12/2007 |
| WO | 2008069950 A2 | 6/2008 |
| WO | 2008117985 A1 | 10/2008 |

OTHER PUBLICATIONS

Yanf, Adative Discontinuous Reception Mechanism for Power Saving in UMTS, Jan. 2007, IEEE, 11, 40-43.*
Jeju, DRX Start Offset Configuration, Aug. 18-22, 2008, 3GPP TSG RAN WG2 # 63.*
3GPP TSG-RAN2 #63bis meeting R2-085979, Sep. 2008.
3GPP TS 36.321 V8.3.0 Evolved Universal Terrestrial Radio Access (E-UTRA) Medium Access Control (MAC) protocol specification, Sep. 2008.
Office action mailed on Jul. 26, 2011 for the China application No. 2009102210022.X, filing date Nov. 3, 2009, p. 1-6.
Catt, "DRX Start Offset configuration", 3GPP TSG RAN WG2 #63, R2-084266, Aug. 18-22, 2008, Jeju, Korea, p. 1-4.

* cited by examiner

*Primary Examiner* — Nittaya Juntima
*Assistant Examiner* — Samina Choudhry
(74) *Attorney, Agent, or Firm* — Winston Hsu; Scott Margo

(57) ABSTRACT

A method of managing an offset operation of discontinuous reception, hereinafter called DRX, for a mobile device of a wireless communication system includes separately managing a start offset operation of a long DRX cycle and a start offset operation of a short DRX cycle.

10 Claims, 5 Drawing Sheets

METHOD OF MANAGING DISCONTINUOUS RECEPTION OFFSET IN A WIRELESS COMMUNICATIONS SYSTEM AND RELATED COMMUNICATION DEVICE

CROSS REFERENCE TO RELATED APPLICATIONS

This application claims the benefit of U.S. Provisional Application No. 61/110,961, filed on Nov. 3, 2008 and entitled "METHOD AND APPARATUS FOR DISCONTINUOUS RECEPTION IN A WIRELESS COMMUNICATIONS SYSTEM" the contents of which are incorporated herein.

BACKGROUND OF THE INVENTION

1. Field of the Invention

The present invention relates to a method utilized in a wireless communication and communication device thereof, and more particularly, to a method of managing an offset operation of discontinuous reception in a wireless communication system and communication device thereof.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A radio interface protocol of the LTE system includes three layers: the Physical Layer (L1), the Data Link Layer (L2), and the Network Layer (L3), wherein a control plane of L3 is a Radio Resource Control (RRC) layer, and L2 is further divided into a Packet Data Convergence Protocol (PDCP) layer, a Radio Link Control (RLC) layer and a Medium Access Control (MAC) layer.

The main services and functions of the MAC layer include, discontinuous reception (DRX), mapping between logical channels and transport channels; multiplexing/demultiplexing of RLC PDUs belonging to one or different radio bearers into/from transport blocks (TB) delivered to/from the physical layer on transport channels; buffer status reporting; power headroom reporting; error correction through HARQ; priority handling between logical channels of one UE; priority handling between UEs by means of dynamic scheduling; and padding.

The UE may be configured by the RRC layer with the DRX functionality that allows the UE to discontinuously monitor a PDCCH (Physical Downlink Control Channel) carrying information about resource allocation of a DL-SCH (Downlink Shared Channel) and uplink (UL) scheduling grants. The DRX functionality is operated based on the following parameters that can be configured by a DRX-configuration information element (IE) of the RRC layer. The related DRX parameters includes:

A DRX Cycle providing a periodic repetition of a "On Duration" followed by a possible inactivity period, where the DRX Cycle is a short or a long DRX cycle;

A DRX Inactivity Timer providing the number of consecutive PDCCH-subframe(s) after successfully decoding a PDCCH indicating an initial UL/DL user data transmission;

A DRX Retransmission Timer providing the maximum number of consecutive PDCCH-subframe(s) as soon as a DL retransmission is expected by the UE;

A DRX Short Cycle Timer providing the number of consecutive subframe(s) during which the UE shall follow the short DRX cycle after the DRX Inactivity Timer has expired;

A HARQ RTT Timer providing the minimum amount of subframe(s) before a DL HARQ retransmission is expected by the UE; and An On Duration Timer providing the number of consecutive PDCCH-subframe(s) at the beginning of a DRX Cycle. The UE monitors the PDCCH only during the On Duration.

When the DRX operation is configured, the UE starts the On Duration Timer if the short DRX cycle is used and [(SFN*10)+subframe number] modulo (the short DRX cycle)=a DRX Start Offset, or if the long DRX cycle is used and [(SFN*10)+subframe number] modulo (long DRX cycle)=the DRX Start Offset. The SFN is a system subframe number of a cell used by the UE.

As can be seen from the above, the same "DRX Start Offset" parameter is applied for managing starting of the short and long DRX cycles. Besides, the DRX-configuration IE includes a "longDRX-CycleStartOffset" IE that contains configuration values of the long DRX cycle and the DRX Start Offset Normally the long DRX cycle is configured to be longer than the short DRX cycle. Therefore, the long DRX cycle Start Offset is possibly incompatible with the short DRX cycle.

For example, the long DRX cycle is 2560 subframes, the short DRX cycle is 640 subframes, and the DRX cycle Start Offset is 1000. Using the DRX cycle Start Offset to configure the DRX Start Offset for the short DRX cycle is unreasonable because no subframe can meet the following equation:

$$[(SFN*10)+\text{subframe number}] \text{ modulo } 640=1000$$

In this situation, the On Duration Timer of the short DRX cycle is impossible to be started.

SUMMARY OF THE INVENTION

Therefore, the present invention provides a method of managing an offset operation of discontinuous reception in a wireless communication system in a wireless communication system and related communication device to solve the above-mentioned problem.

According to an aspect of the present invention, a method of managing a DRX offset operation for a mobile device of a wireless communication system is disclosed. The method includes separately managing a start offset operation of a long DRX cycle and a start offset operation of a short DRX cycle.

According to an aspect of the present invention, a communication device of a wireless communication system for accurately managing a DRX offset operation is further disclosed and includes a computer readable recording medium, a processor, a communication interfacing unit, and a control unit. The computer readable recording medium is used for storing program code corresponding to a process. The processor is coupled to the computer readable recording medium and used for processing the program code to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes separately manage a start offset operation of a long DRX cycle and a start offset operation of a short DRX cycle.

According to another aspect of the present invention, a method of managing an offset operation of DRX for a mobile device of a wireless communication system includes utilizing a short DRX Start Offset only for a short DRX cycle.

According to another aspect of the present invention, a communication device of a wireless communication system for accurately managing a DRX offset operation is further disclosed and includes a computer readable recording medium, a processor, a communication interfacing unit, and a control unit. The computer readable recording medium is used for storing program code corresponding to a process. The processor is coupled to the computer readable recording medium and used for processing the program code to execute the process. The communication interfacing unit is used for exchanging signals with a peer communication device of the wireless communication system. The control unit is coupled to the processor and communication interfacing unit, and used for controlling the communication interfacing unit and the communication device according to processing results of the processor. The process includes utilizing a short DRX Start Offset only for a short DRX cycle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
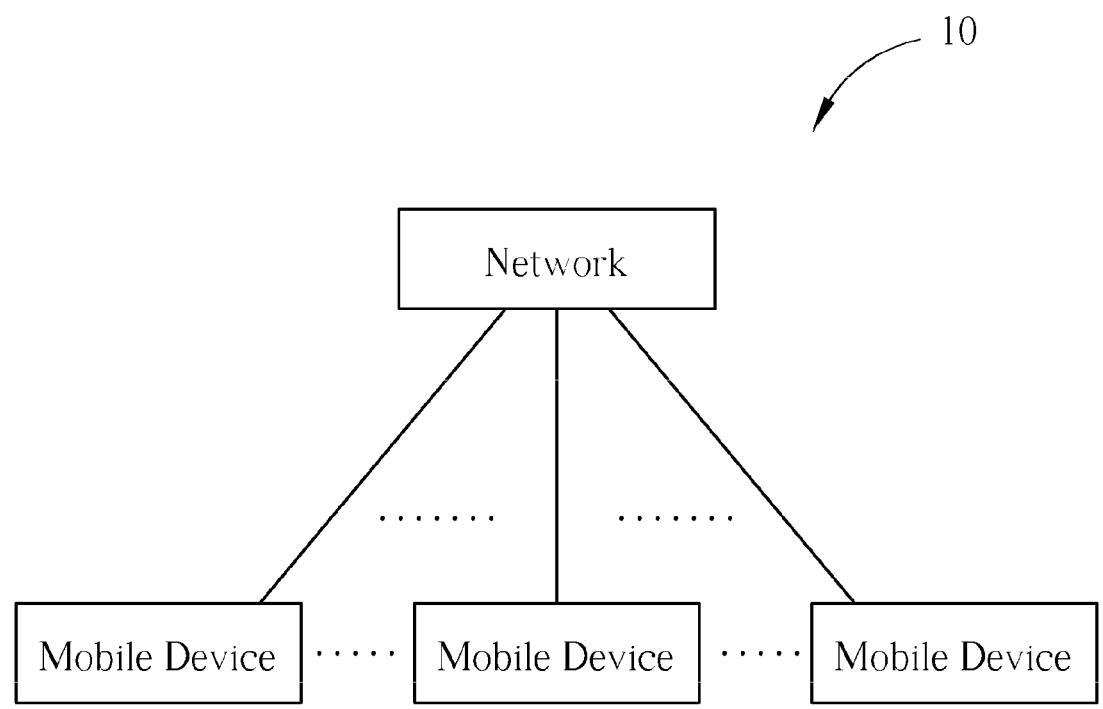
FIG. 1 is a schematic diagram of a wireless communication system.

Please refer to FIG. 1, which illustrates a schematic diagram of a wireless communication system 10 according to an embodiment of the present invention. Briefly, the wireless communication system 10 is composed of a network and a plurality of mobile devices. In FIG. 1, the network and the mobile devices are simply utilized for illustrating the structure of the wireless communication system 10. The wireless communication system 10 can be an LTE (long-term evolution) system. In the LTE system, the network is referred as a EUTRAN (evolved-UTRAN) comprising a plurality of eNBs, whereas the mobile devices are referred as user equipments (UEs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
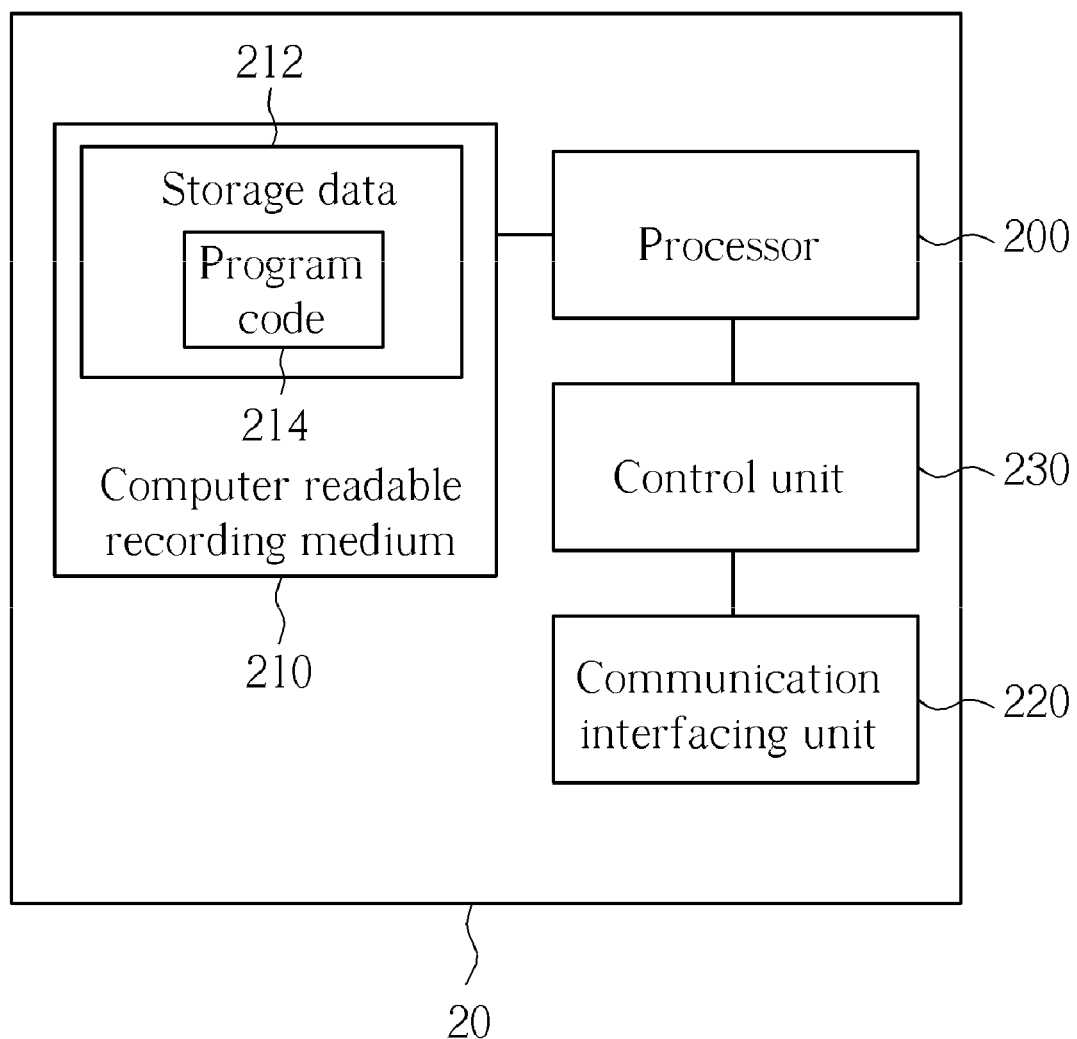
FIG. 2 is a schematic diagram of a communication device according to an embodiment of the present invention.

Please refer to FIG. 2, which illustrates a schematic diagram of a communication device 20 according to an embodiment of the present invention. The communication device 20 can be the mobile devices shown in FIG. 1 and includes a processor 200, a computer readable recording medium 210, a communication interfacing unit 220 and a control unit 230. The computer readable recording medium 210 is any data storage device that includes program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the communication device 20 according to processing results of the processor 200. The communication interfacing unit 220 is preferably a radio transceiver and accordingly exchanges wireless signals with the network.

Figure 3:
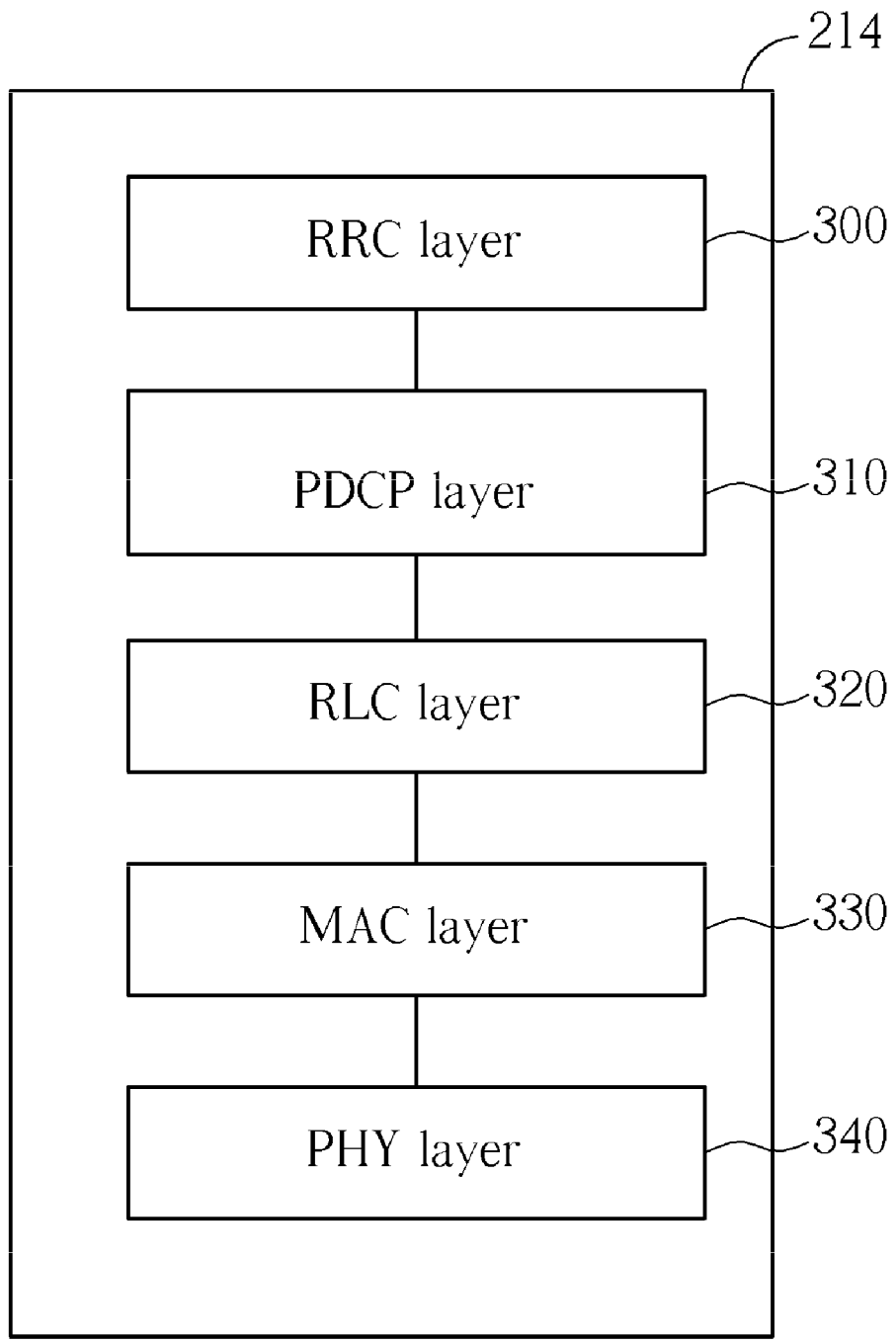
FIG. 3 is a schematic diagram of the program code for the LTE system according to an embodiment of the present invention.

Please refer to FIG. 3, which illustrates a schematic diagram of the program code 214 for the LTE system according to an embodiment of the present invention. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340.

The PHY layer 340 can monitor a PDCCH (Physical Downlink Control Channel) for maintaining a subframe number and receiving configuration/resource information for the MAC layer 330, RRC layer 300, etc. The MAC layer 330 has discontinuous reception (DRX) functionality allowing periodic PDCCH reception followed by a possible inactivity period. The DRX is operated with a long DRX cycle or a short DRX cycle, each including a "On Duration" during which the PDCCH reception is executed. The "On Duration" is set according to an On Duration Timer. In addition, a start offset operation is executed when the long DRX cycle or the short DRX cycle is used, to prevent different UEs from simultaneously monitoring the PDCCH. The RRC layer 300 uses RRC messages or information elements (IEs) to configure operations of the lower layers, e.g. the MAC layer 330, or provide cell information, such as a current system frame number (SFN).

Figure 4:
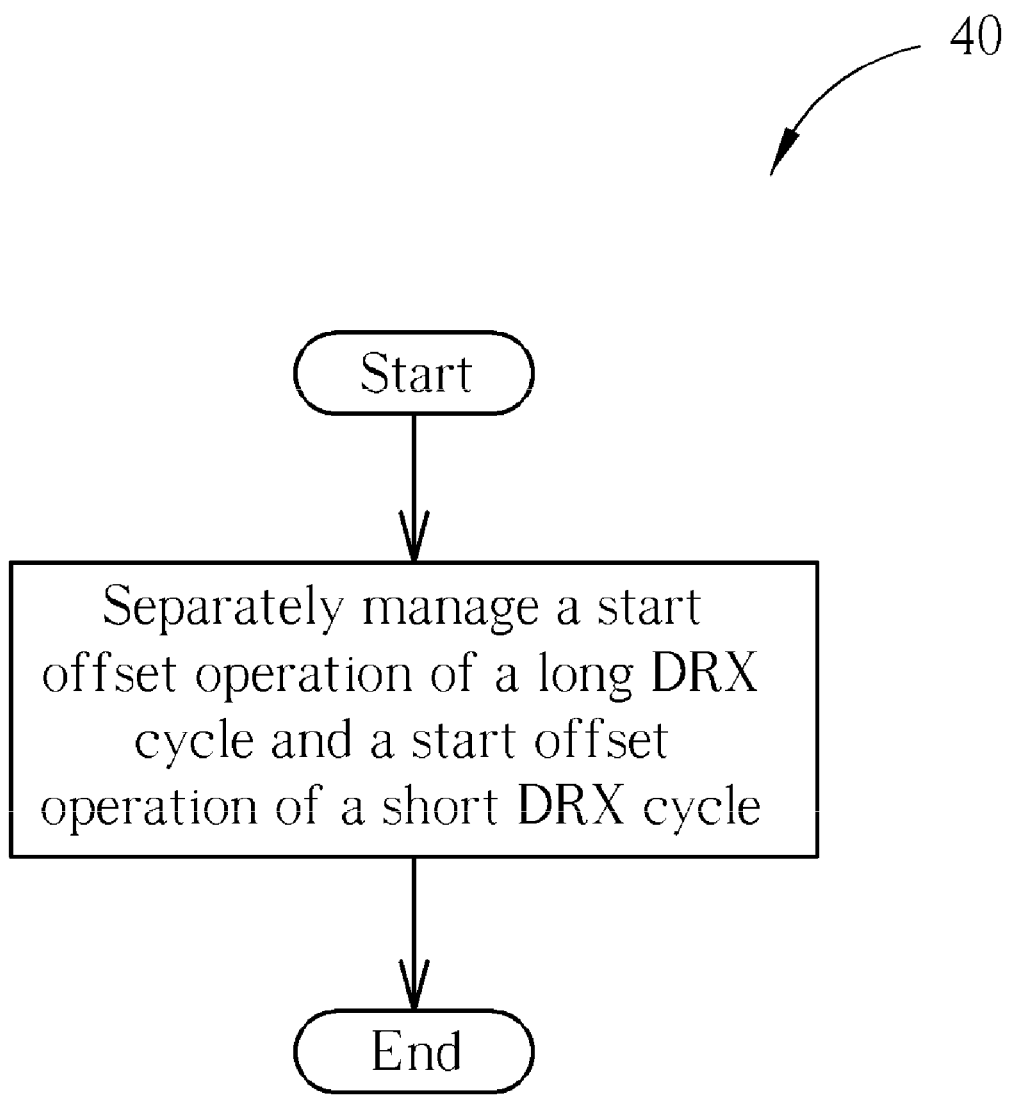
FIG. 4 is a flowchart of a process according to an embodiment of the present invention.

Please refer to FIG. 4, which illustrates a flowchart of a process 40 according to an embodiment of the present invention. The process 40 is utilized for managing a DRX offset operation for a UE of a wireless communication system. The process 40 can be compiled into the program code 214 and includes the following steps:

Step 400: Start.

Step 410: Separately manage a start offset operation of a long DRX cycle and a start offset operation of a short DRX cycle.

Step 420: End.

According to the process 40, the UE separately manages the start offsets of the long DRX cycle and the short DRX cycle. Preferably, the UE utilizes a long DRX Start Offset and a short DRX Start Offset for the long DRX cycle and the short DRX cycle respectively for the MAC DRX operation. That is, the UE uses separate offset parameters for configurations of the long and short DRX cycles.

When the short DRX cycle is used, the UE determines a SFN and a subframe number matching the following equation (A1):

$$[(\mathit{SFN}*10)+\text{a subframe number}] \text{ modulo (the short } \mathit{DRX} \text{ cycle)}=\text{the short } \mathit{DRX} \text{ Start Offset}.$$

When the long DRX cycle is used, the UE determines a SFN and a subframe number matching the following equation (A2):

$$[(SFN*10)+\text{subframe number}] \text{ modulo (long } DRX \text{ cycle)} = \text{the long } DRX \text{ Start Offset.}$$

Please note that constant variables in the equations (A1) and (A2) can be adjusted according to relationship between the SFN and the subframe, depended on the system deployment.

To start short or long DRX cycle, the UE starts the On Duration Timer when the matching SFN and subframe number are determined. In other words, the UE starts the On Duration Timer when the short DRX cycle is used and [(SFN*10)+a subframe number] modulo (the short DRX cycle)=the short DRX Start Offset, or when the long DRX cycle is used and [(SFN*10)+subframe number] modulo (long DRX cycle)=the long DRX Start Offset.

As can be seen from the above, the short DRX Start Offset is utilized only for the start offset operation of the short long DRX cycle, not involving with the start offset operation of the long DRX Start Offset.

For RRC DRX configuration, the short and long DRX Start Offsets can be obtained from separate configuring source. For example, in addition to a longDRX-CycleStartOffset IE, a shortDRX-CycleStartOffset IE is employed by a DRX-configuration IE used in the communication between the UE and the network. The short and long DRX Start Offsets can be explicitly set according to the short and longDRX-CycleStartOffset IEs respectively. The short/long DRX cycle Start Offset is configured with a range from 0 to (the short/long DRX cycle−1) by the UE or the network.

Alternatively, the short and long DRX Start Offsets can be obtained from the same configuring source. For example, the DRX-configuration IE employs the longDRX-CycleStartOffset IE including a DRX Start Offset parameter, but not the shortDRX-CycleStartOffset IE. In other words, the shortDRX-CycleStartOffset IE does not exist in the configuration communication. Since the DRX Start Offset parameter is set by the network based on specification of the long DRX Start Offset, the short DRX Start Offset is set to a value of [(the DRX Start Offset+n) modulo (the short DRX cycle)], where n is an integer or 0. In addition, n can adopt a value of the subframe number. By applying modulus with a modulus base of the short DRX cycle, the range of Short DRX Start Offset is limited to a range from 0 to (the short DRX cycle−1).

Figure 5:
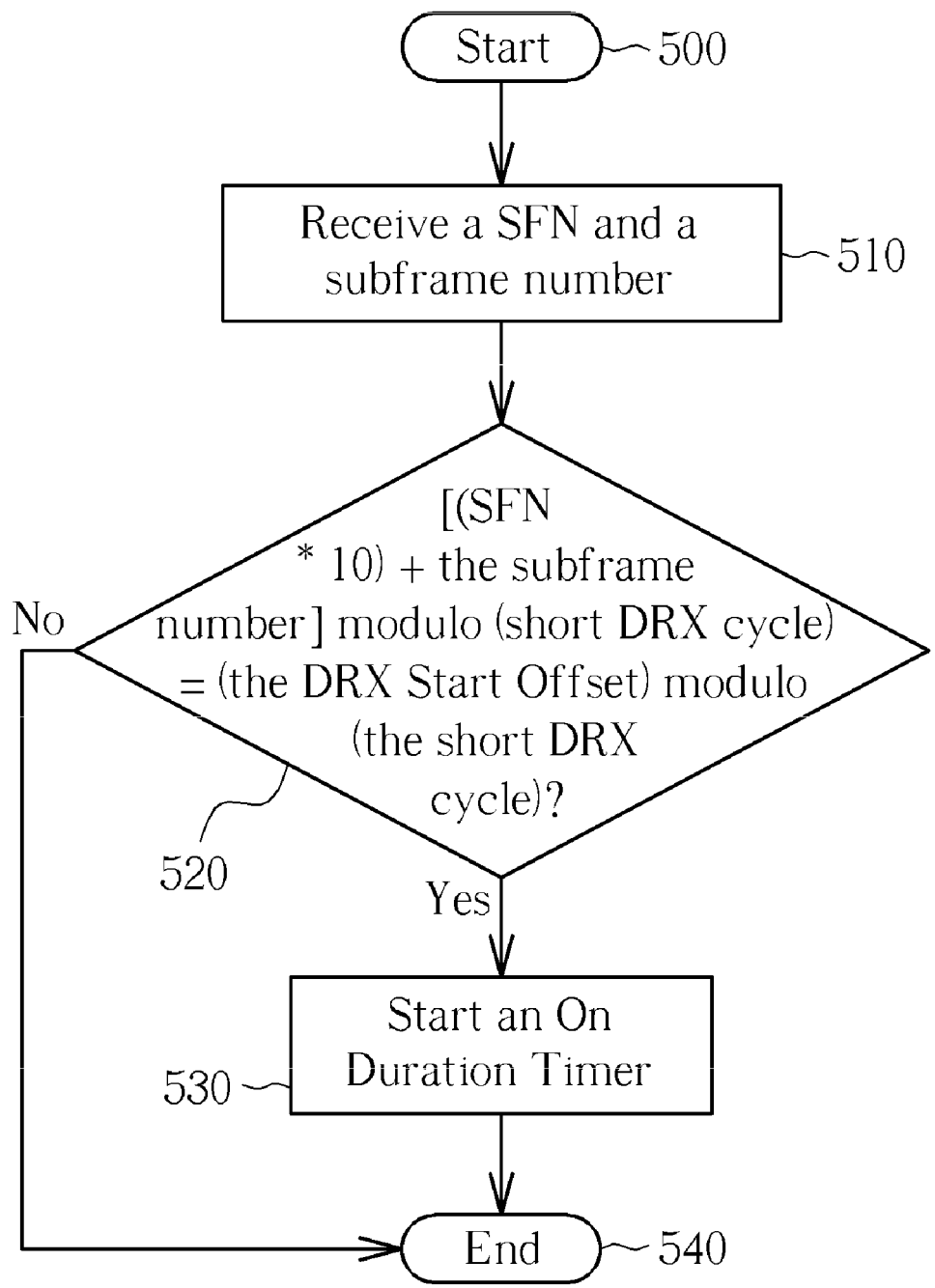
FIG. 5 is a flowchart of a process according to an embodiment of the present invention.

As can be seen from the above, [(SFN*10)+a subframe number] modulo (the short DRX cycle)=the short DRX Start Offset, and the short DRX Start Offset=[(the DRX Start Offset+n) modulo (the short DRX cycle)]. In this situation, the UE starts the On Duration Timer when the short DRX cycle is used and [(SFN*10)+the subframe number] modulo (short DRX cycle)=(the DRX Start Offset+n) modulo (the short DRX cycle). A related processed is shown in FIG. 5, which illustrates a flowchart of a process 50 for the On Duration starting mechanism of short DRX cycle in the MAC layer of the UE. The process 50 includes the following steps:

Step 500: Start.

Step 510: Receive a SFN and a subframe number.

Step 520: Determine whether [(SFN*10)+the subframe number] modulo (short DRX cycle)=(the DRX Start Offset) modulo (the short DRX cycle)? If so, perform Step 530; else go to Step 540.

Step 530: Start an On Duration Timer.

Step 540: End.

According to the process 50, the MAC layer receives a SFN and a subframe number from e.g. the physical layer. In the LTE system, SFN is numbered from 0 to 1023, each containing ten subframe numbers numbered from 0 to 9. The MAC layer can put the received SFN and subframe number into the equation of the Step 520 to determine whether any SFN and subframe number matches the equation or not. If one match is found, the UE starts the On Duration Timer for the PDCCH reception. In the equation of the Step 520, (the DRX Start Offset) is derived from the abovementioned (the DRX Start Offset+n) by setting n to 0. Therefore, each time the MAC layer receives a SFN and a subframe number, the process 50 is executed to check if the On Duration timer needs to be started or not.

In conclusion, the embodiment of the present invention separately manages the start offset operations of the short and long DRX cycles to improve the defect of the On Duration starting mechanism of the short DRX cycle.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing an offset operation of discontinuous reception, hereinafter called DRX, for a mobile device of a wireless communication system, the method comprising:
   separately managing a start offset operation of a long DRX cycle and a start offset operation of a short DRX cycle by the mobile device, comprising:
      utilizing a long DRX Start Offset for the long DRX cycle; and
      utilizing a short DRX Start Offset for the short DRX cycle;
   receiving a longDRX-CycleStartOffset Information Element containing a DRX Start Offset, used as the long DRX Start Offset, from a network; and
   setting the short DRX Start Offset to a value of [(the DRX Start Offset+n) modulo (the short DRX cycle)], where n is an integer or zero.

2. The method of claim 1, further comprising:
   determining a first system frame number and a first subframe number when the short DRX cycle is used, wherein the first system frame number and the first subframe number matches an equation of [(the first system frame number*10)+the first subframe number] modulo (the short DRX cycle)=the short DRX Start Offset; and
   determining a second system frame number and a second subframe number when the long DRX cycle is used, wherein the second system frame number and the second subframe number matches an equation of [(the second system frame number*10)+the second subframe number] modulo (the long DRX cycle)=the long DRX Start Offset.

3. The method of claim 2, further comprising starting an On Duration Timer when the first system frame number and the first subframe number are determined, or when the second system frame number and the second subframe number are determined.

4. A method of managing an offset operation of discontinuous reception, hereinafter called DRX, for a mobile device of a wireless communication system, the method comprising:
   utilizing a short DRX Start Offset only for a short DRX cycle by the mobile device;
   receiving a longDRX-CycleStartOffset Information Element containing a DRX Start Offset, used as the long DRX Start Offset, from a network; and setting the short DRX Start Offset to a value of [(the DRX Start Offset+n) modulo (the short DRX cycle)], where n is an integer or zero.

5. The method of claim 4, further comprising:
determining a system frame number and a subframe number, wherein the system frame number and the subframe number matches an equation of [(the system frame number*10)+the subframe number] modulo (the short DRX cycle)=the short DRX Start Offset.

6. The method of claim 5, further comprising starting an On Duration Timer when the system frame number and the subframe number are determined.

7. A communication device of a wireless communication system for managing an offset operation of discontinuous reception, hereinafter called DRX, the communication device comprising:
a non-transitory computer readable recording medium for storing program code corresponding to a process;
a processor coupled to the computer readable recording medium, for processing the program code to execute the process;
wherein the process comprises:
separately managing a start offset operation of a long DRX cycle and a start offset operation of a short DRX cycle, comprising:
utilizing a long DRX Start Offset for the long DRX cycle; and
utilizing a short DRX Start Offset for the short DRX cycle;
receiving a longDRX-CycleStartOffset Information Element containing a DRX Start Offset, used as the long DRX Start Offset, from a network; and
setting the short DRX Start Offset to a value of [(the DRX Start Offset+n) modulo (the short DRX cycle)], where n is an integer or zero.

8. The communication device of claim 7, wherein the process further comprises:
determining a first system frame number and a first subframe number when the short DRX cycle is used, wherein the first system frame number and the first subframe number matches an equation of [(the first system frame number*10)+the first subframe number] modulo (the short DRX cycle)=the short DRX Start Offset; and
determining a second system frame number and a second subframe number when the long DRX cycle is used, wherein the second system frame number and the second subframe number matches an equation of [(the second system frame number*10)+the second subframe number] modulo (the long DRX cycle)=the long DRX Start Offset.

9. The communication device of claim 8, wherein the process further comprises starting an On Duration Timer when the first system frame number and the first subframe number are determined, or when the second system frame number and the second subframe number are determined.

10. A communication device of a wireless communication system for operating discontinuous reception, hereinafter called DRX, the communication device comprising:
a non-transitory computer readable recording medium for storing program code corresponding to a process;
a processor coupled to the computer readable recording medium, for processing the program code to execute the process;
wherein the process comprises:
utilizing a short DRX cycle;
receiving a longDRX-CycleStartOffset Information Element containing a DRX Start Offset, used as the long DRX Start Offset, from a network;
determining a system frame number and a subframe number, wherein the system frame number and the subframe number matches an equation of [(the system frame number*10)+the subframe number] modulo (the short DRX cycle)=[(the DRX Start Offset+n) modulo (the short DRX cycle)], where n is an integer or zero; and
starting an On Duration Timer when the system frame number and the subframe number are determined.

* * * * *